Patented May 4, 1937

2,079,484

UNITED STATES PATENT OFFICE 2,079,484

WELDING ROD AND THE LIKE

Irving T. Bennett, Rome, N. Y., assignor to Revere Copper and Brass Incorporated, Rome, N. Y., a corporation of Maryland No Drawing. Application July 16, 1935, Serial No. 31,622. Renewed February 16, 1937

12 Claims. (Cl. 219—8)

My invention relates to welding bodies such as welding rods for use in building up and conditioning metal parts as, for example, reconditioning worn locomotive axles, bearings, bushings, hub-liners, and the like, by building them up and shaping them.

This application is a continuation in part of my copending application Serial Number 16,816, filed April 17, 1935.

Heretofore it has been proposed to recondition worn parts by building them up by depositing thereon so-called "weld metal", employing for this purpose a welding rod and any suitable process effective progressively to melt the end portion of the rod and bond the molten metal to the part, and, after the part is gradually built up in this way and cooled, to machine it to the desired shape and size.

In the attempt to condition metal parts in this way it has been found that known metals suitable for welding are difficult to machine, especially after being subjected to the welding operation for building up the part. Further, it has been found that weld metals heretofore proposed have the defect of presenting poor bearing metals due to the tendency of the bearing made of them to "seize" or "grab" as it is commonly termed.

Applicant has found, that by suitably incorporating uncombined lead into the melt of which the part is built up, the same may be readily machined, although such metal containing lead it has been found would be unsuitable for ordinary welding purposes because lead would act to weaken the strength of the welded joint uniting the parts welded together. Further, the uncombined lead it has been found acts to prevent so-called "seizing" or "grabbing" in the bearing, probably because its action is in the nature of a lubricant.

In the practice of the invention, the base metal of which the part is built up is such that it will not alloy with lead, in order that the lead may exist as minute globules distributed or dispersed throughout the metal. Copper and certain copper-content alloys it has been found are admirably suited for this purpose because lead, which practically is insoluble in copper, alloys with them with difficulty, if at all. The built up part therefore according to the invention consists of copper or a copper-base alloy with which is mechanically mixed, as distinguished from alloyed, a relatively small percentage of lead distributed throughout the metal. Satisfactory results will ordinarily be secured with appreciable amounts of lead up to about 5 or 6%, although for some uses the amount of lead may be advantageously increased up to about 15%.

The welding metal, which conveniently may be in the form of a welding rod, may be made by introducing lead into the melt and casting the rod, or after casting the billet cold rolling it to the desired size and shape to form the rod. In such rods the lead will be only mechanically associated with the copper or copper alloy for the reason that it will exist only as a mechanical mixture therewith, the lead being dispersed throughout the rod in the form of minute globules. However, working copper or copper alloys containing lead is ordinarily an expensive process because lead ordinarily renders such metal "hot short", that is to say, such metals cannot be hot rolled or otherwise worked hot.

Conveniently, therefore, the welding rod consists of copper or a copper-base alloy which can be hot worked and has the lead mechanically associated with it in some way other than by introducing the lead into the melt of which the rod material is formed. Preferably this is done by hot rolling a lead-free copper or copper-base alloy into rods, or it may be done by hot rolling the metal into sheets, say about 3/8" thick, and shearing the sheets to form rods of approximately square cross-section, the opposite sides being left rough as the result of the shearing operations. The rod, however formed, may be coated with lead by dipping it into molten metal or spraying it with it, the roughened surfaces of the rod when sheared causing a greater amount of lead to adhere than would otherwise be the case. For a rod of given weight, a square or other polygonal cross-section of the rod it will be understood provides a greater surface area for adherence of the lead than would otherwise be the case if the rod were circular in cross-section.

It will be understood that the lead may be mechanically associated with the copper or copper-base alloy in other ways as, for example, by employing tubing with a lead filler, or by wrapping the rod with lead tape, or by drawing or extruding a lead tube over the rod, or by electro-depositing a coating of lead upon the rod, or by any of the known methods of forming composite rods.

It is also possible to coat the rod with lead dust, or other forms of comminuted lead, mixed with a binder to make the lead adhere to the rod. Such a coating may be formed by mixing lead dust with a sufficient amount of sodium or potassium silicate and water, say two-thirds potassium silicate and one-third water, to form a paste of the consistency of a rather thick paint, which paste may be applied to the rod by dipping it into the paste, or by use of a brush.

It is also possible to coat a copper rod, or one formed of a copper-content alloy, with separate layers of lead and tin, or with a lead-tin or other lead-content alloy, and upon melting of the rod the tin, or other non-lead constituents, will dissolve in the copper or copper-base while the lead will be distributed through the mass as a mechanical mixture with it. It will be understood that the amounts of lead and tin employed in these examples will be such as to incorporate into the metal deposited on the metal part the percentages of lead and tin herein elsewhere specified, and that in this way additional lead and tin may be added to the alloy or mixture of which the body of the rod is formed when said alloy or mixture already contains these metals.

The rod also may be coated or otherwise mechanically associated with a lead compound and a reducing agent to form metallic lead during the welding operation. This lead compound may consist of lead oxide or red lead, and the reducing agent may consist of lamp black or other carbonaceous substance. The lead compound and the lamp black may be mixed with a suitable binder to form a paste which may be applied to the rod by a brushing or dipping operation. For example, 10 parts lead oxide may be mixed with 1 part lamp black and a mixture of potassium or sodium silicate and water, say two-thirds potassium silicate to one-third water, to form a paste. As a substitute for lamp black, colloidal graphite may be employed. As binders liquid shellac and linseed oil may be employed, which carbonaceous substances will produce a char that also will act as a reducing agent. Conveniently the lead oxide or other lead compound of which the paste is formed is in a finely divided state as, for example, a powder which will pass through an 80 to 200 mesh screen, sufficient of a binder being employed to form a rather thick paint.

Preferably the operation of building up the metal part by use of the above described welding rods is performed by depositing the rod thereon by a welding process, say by use of an electric arc. Preferably the operation is performed by arc-depositing the material of the rod by use of the so-called "carbon arc" process, although, if desired, it may be performed by use of the so-called "electric metallic arc" process. During the operation of building up the part by these processes a small amount of lead is melted with the fractions of the rod being deposited and is dispersed by the arc, whether the lead is mixed with the rod, or the latter is coated or otherwise associated with lead or an alloy or reducible compound thereof.

It has been found that by use of these processes a superior admixture of the lead with the copper or copper-base is secured, in fact a much finer division of the lead and a more uniform distribution of the same than could be secured by a casting process. From these aspects the processes constitute improved methods of producing leaded copper or copper-base mixtures.

Preferably, but not necessarily, and without limitation thereto, the copper is in the form of a copper-base alloy containing silicon, silicon acting to aid in securing an excellent dispersion of the lead through the metal of the built up part. Such an alloy may consist of 2 to 4.7% silicon, at least 0.1% tin throughout this range of silicon, with the balance approximately all copper. The maximum amount of tin for any value of silicon up to 3% may be as high as 2% and should not exceed this value, while when the silicon is above approximately 3% the maximum amount of tin should vary between approximately 0.9 and 2% inversely and linearly with the amount of silicon, that is to say, when the silicon is 3 and 4.7% the maximum amount of tin should not exceed approximately 2 and 0.9% respectively and between these values of silicon the maximum amount of tin should decrease uniformly with the increase in the amount of silicon. If desired, however, the silicon may be as low as 0.01% throughout the entire range of tin. Appreciable amounts up to 0.5% zinc, or in any event preferably not more than 1% zinc, may be incorporated into the alloy for improving its working qualities, and, if desired, a small amount of phosphorus may be incorporated for improving the welding properties of the rod. Appreciable results will be obtained with as low as 0.005% phosphorus, and preferably the phosphorus should not exceed 0.1% with the higher amounts of silicon and tin and 0.25% with the lower amounts of silicon and tin, lest it render the metal "hot short". A satisfactory specific example of this metal is silicon 3.5%, tin 0.5%, balance copper, and, if desired, either or both 0.05% phosphorus and 0.25% zinc substituted for part of the copper. Such metal has great ductility and high strength. It works freely both hot and cold, and has excellent resistance to corrosion. It also machines freely, and presents a good bearing surface.

If desired, the copper-base alloy may consist of binary silicon-bronze, with or without small amounts of zinc or phosphorus, or both, within the ranges of zinc and phosphorus above specified. The binary alloys with the addition of small amounts of manganese may also be employed. From 0.5 to 1.25% manganese will give satisfactory results. Bronzes of this group may contain 0.1 to 5% silicon, about 3 to 3.5% being the preferred amount. If the alloys are cast the phosphorus may be as high as 10.

Other copper-base alloys as, for example, binary tin-bronzes may be employed. Preferably the amount of tin is about 10%, but lower values, say down to 1%, and higher values, say up to 12%, will give fairly satisfactory results. Phosphorus may also be added to these alloys, preferably not more than 0.05%. However, if desired, the phosphorus may run up to 1%. An example of a suitable alloy of this group is 10% tin, 0.12% phosphorus, balance copper.

A binary copper-phosphorus welding rod may also be employed for the copper-base alloy as, for example, copper rods containing 6 to 10% phosphorus.

The tin may be omitted, if desired, from the hereinbefore described alloys of which the body of the rod is formed, and may be placed in the coating of the rod, as above described, so that the tin will alloy with the copper-base when the rod is melted.

If desired the alloy of which the welding rod is made may contain nickel instead of silicon for improving the dispersion of the lead. Up to 1% nickel will be sufficient to disperse up to about 10% lead, and proportionate amounts of nickel may be employed for higher amounts of lead. In general, any of the above mentioned alloys which do not contain silicon may have incorporated therein a small amount of nickel for this purpose. As little as 0.1% nickel will give appreciable results, but preferably about 1% thereof is employed as giving satisfactory results for all values of lead.

It will be understood that as herein used the term "welding rod" is intended to include any welding metal body of convenient size and shape for performing the desired operation as, for example, it may be in the form of a wire, pencil, bar, strip, or sheet. These welding rods distinguish from prior welding rods in that they consist of copper or a copper-content alloy mechanically associated with lead or other insoluble metal, or with an alloy or compound of the same, which will act to give the weld metal desirable properties herein mentioned.

It will be understood that within the scope of the appended claims wide deviations may be made from the above described welding rods and copper-content alloys without departing from the spirit of the invention.

I claim:

1. A welding rod comprising copper or a copper-base alloy mechanically associated with substance comprising reducible lead compound capable of introducing into the weld metal from appreciable amounts up to about 15% lead.

2. A welding rod according to claim 1 in which lead compound is contained in a coating for the rod.

3. A welding rod comprising copper or a copper-base alloy containing 0.01 to 5% silicon mechanically associated with substance comprising reducible lead compound capable of introducing into the weld metal from appreciable amounts up to about 15% lead.

4. A welding rod according to claim 3 in which the lead compound is contained in a coating for the rod.

5. A welding rod comprising a hot and cold workable copper-base alloy, containing at least 99% copper, 0.1 to 4.7% silicon and 0.1 to 3% tin, mechanically associated with substance comprising reducible lead compound capable of introducing into the weld metal from appreciable amounts up to about 15% lead.

6. A welding rod according to claim 5 in which the copper-base alloy contains up to about 0.1% phosphorus.

7. A welding rod according to claim 5 in which the lead compound is contained in a coating for the rod.

8. A welding rod according to claim 5 in which the copper-base alloy contains up to about 0.1% phosphorus and the lead compound is contained in a coating for the rod.

9. A welding rod comprising a phosphor-bronze, containing up to 12% tin and up to 1% phosphorus, mechanically associated with substance comprising reducible lead compound capable of introducing into the weld metal from appreciable amounts up to about 15% lead.

10. A welding rod according to claim 9 in which the phosphorus does not exceed about 0.05%.

11. A welding rod according to claim 9 in which the lead compound is contained in a coating for the rod.

12. A welding rod according to claim 9 in which the phosphorus does not exceed about 0.05% and the lead compound is contained in a coating for the rod.

IRVING T. BENNETT.